UNITED STATES PATENT OFFICE.

MARCUS O. FARRAR AND CHARLES C. HOWE, OF BRISTOL, NEW HAMPSHIRE.

COMPOSITION OF MATTER FOR INSULATING PURPOSES.

SPECIFICATION forming part of Letters Patent No. 461,467, dated October 20, 1891.

Application filed March 6, 1891. Serial No. 384,024. (No specimens.)

*To all whom it may concern:*

Be it known that we, MARCUS O. FARRAR and CHARLES C. HOWE, citizens of the United States, residing in Bristol, county of Grafton, and State of New Hampshire, have invented a new and useful composition of matter to be used as an insulating covering or conduit for wires carrying an electric current underground or otherwise, of which the following is a specification.

Our composition consists of the following ingredients: Silica, 434.7 to 478.4 parts; alumina, 297.6 to 362.3 parts; peroxide of iron, 13.4 to 88 parts; magnesia, 3.7 to 21 parts; lime, 2.9 to 13.8 parts; soda, 3.2 to 41 parts; potash 55.1 to 124.4 parts; water, 14.5 to 62.2 parts; asphaltum, fifty to seventy-five per cent. These substances thoroughly mixed and incorporated, aided by heat and molded under pressure into desired forms, result in a perfect insulator for electric wires unaffected by extreme temperature of the weather or by moisture, or by combinations of moisture, acids, and alkalies which may occur accidentally or naturally in the soil.

What we claim, and desire to secure by Letters Patent of the United States, is—

The herein-described composition of matter to be used for insulating wires carrying an electric current or molding the same into conduits for conveying said wires underground, consisting of silica, alumina, peroxide of iron, magnesia, lime, soda, potash, water, and asphaltum in the propertions specified.

MARCUS O. FARRAR.
CHARLES C. HOWE.

Witnesses:
GEO. A. EMERSON,
A. F. CATE.